United States Patent [19]

Duginske et al.

[11] Patent Number: 4,920,846
[45] Date of Patent: May 1, 1990

[54] GUIDE BLOCKS FOR BANDSAW BLADE

[76] Inventors: Mark A. Duginske, 1011 North First Avenue, Wausau, Wis. 54401; Barry C. Cutter, 1011 South Virginia Street, Hopkinsville, Ky. 42240

[21] Appl. No.: 241,299

[22] Filed: Sep. 7, 1988

[51] Int. Cl.$^5$ .............................................. B26D 1/54
[52] U.S. Cl. ........................................ 83/820; 83/824
[58] Field of Search ................. 83/824, 823, 701, 820, 83/821; 252/12, 12.2, 12.4; 384/911, 909, 908, 907.1, 907, 42

[56] References Cited

U.S. PATENT DOCUMENTS

| | | | |
|---|---|---|---|
| 1,374,600 | 4/1921 | Newell | 83/820 X |
| 3,872,762 | 3/1975 | McKillip et al. | 83/820 |
| 4,054,337 | 10/1977 | Matt et al. | 384/911 X |
| 4,134,842 | 1/1979 | Orkin et al. | 252/12.6 |
| 4,258,601 | 3/1981 | Tanabe | 83/823 X |
| 4,263,361 | 4/1981 | Hodes et al. | 384/911 X |
| 4,290,330 | 9/1981 | Washio et al. | 83/824 X |
| 4,394,337 | 7/1983 | Kummermehr | 252/62 X |
| 4,563,928 | 1/1986 | Salomonsson | 83/821 |

Primary Examiner—Douglas D. Watts
Assistant Examiner—Rinaldi Rada
Attorney, Agent, or Firm—Quarles & Brady

[57] ABSTRACT

A bandsaw (10) including guide blocks (46,47, & 46',47') arranged to restrict side-to-side movement of the blade (25) of the bandsaw wherein the guide blocks are made of fiber reinforced graphite impregnated phenolic resin material.

3 Claims, 1 Drawing Sheet

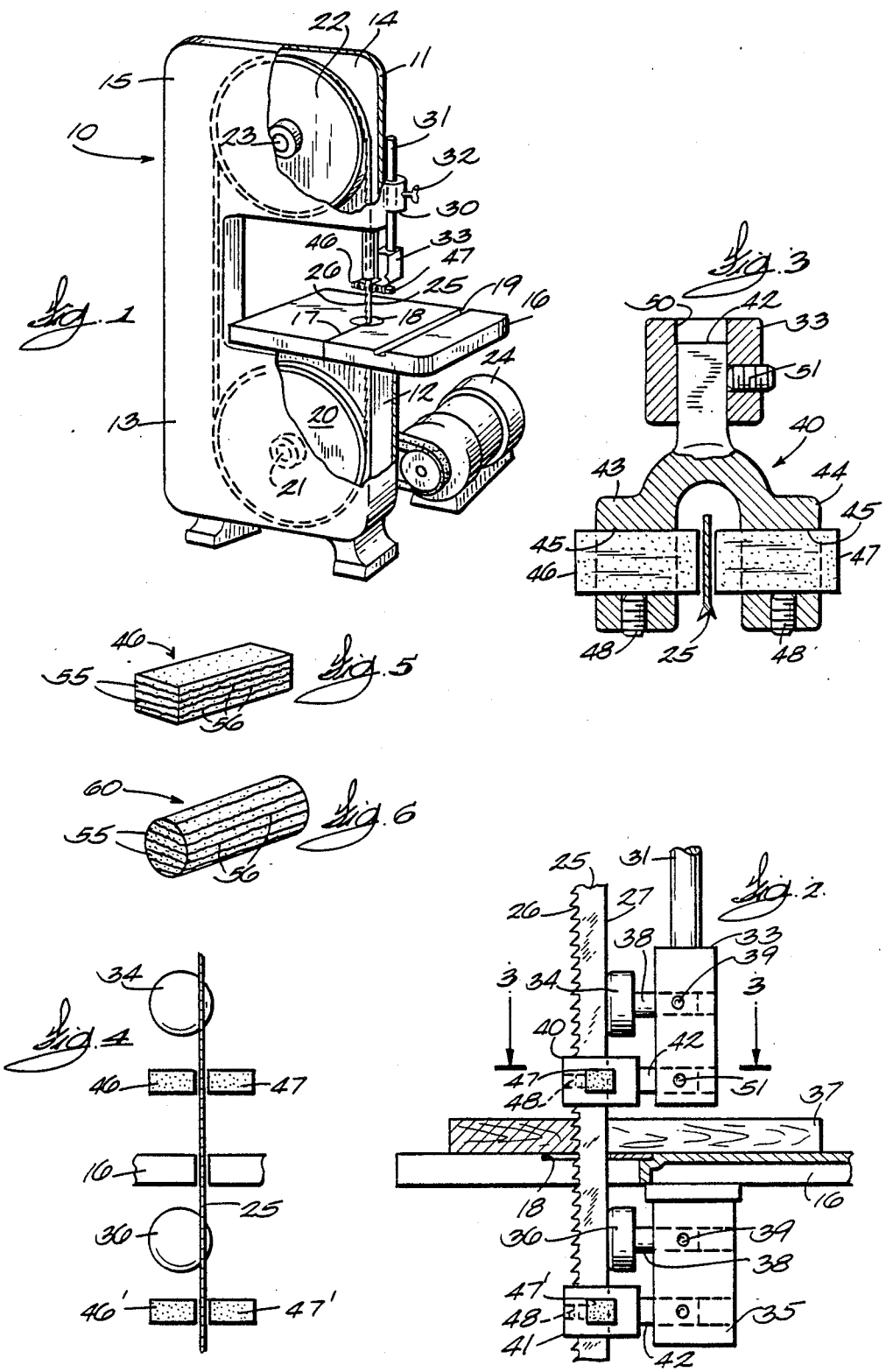

GUIDE BLOCKS FOR BANDSAW BLADE

TECHNICAL FIELD

This invention relates to guide blocks for the blade of a bandsaw which are made of a material not heretofore used for such purpose and which provide important advantages as compared to the guide blocks currently used for bandsaw blades.

BACKGROUND DISCUSSION

A bandsaw utilizes a blade that is in the form of a continuous thin metal band that (the tool is named after this type of blade) is trained about two wheels of the bandsaw, one of which is driven so as to rotate the blade and the other of which is adjustable to control the angle of the blade. A bandsaw is the most flexible of wood cutting tools as it can be used to make straight and curved cuts, and also complex curved cuts since it uses a narrow blade which enables a workpiece to be rotated during the cutting action. The blade exerts a downward cutting force on the workpiece, which serves to hold the workpiece securely and provides a relatively safe cutting tool. Also, the narrow blade kerf requires less horsepower and creates much less waste in comparison to other wood cutting power tools.

A bandsaw employs a mechanism to prevent the backward movement of the blade during the cutting action which can result in the blade being moved or shoved off the wheels about which it is trained. On most bandsaws, a round wheel bearing called a "thrust bearing" is used for this purpose, and is located along the back of the blade, i.e. the edge of the blade opposite from the saw teeth. A thrust bearing is referred to by various names, such as "blade support", "roller guide", "bearings", "supports", and will be referred to as a thrust bearing in this description. Most bandsaws incorporate two thrust bearings, one located above and the other below the work table.

A bandsaw also includes a mechanism for preventing or reducing sideways movement or deflection of the blade during the cutting action, and also preventing excessive twisting of the blade when cutting curves. Bandsaws employ "guide blocks" for this purpose, which are sometimes also referred to as "blocks" or "pins", generally comprising two pairs of guide blocks with one pair positioned above the worktable and the other pair below the worktable and with the guide blocks of each pair located along opposite sides of the blade.

For the last 100 years, guide blocks have been made out of metal, either in the form of metal blocks or round metal rods, which was an appropriate choice of material for guide blocks when bandsaws were running at very slow speeds. However, the average wood cutting bandsaw now runs at very high speeds, such as in the range of about 2800 feet per minute. At this high speed, metal is no longer the appropriate material for use as guide blocks, principally due to the friction created between the guide blocks and the metal blade. The friction generates heat which shortens blade life, such as by causing premature blade failure and/or loss of tooth hardness. This is especially prevalent with narrow blades such as must be used for making tight curves, since narrow blades don't have sufficient mass to absorb and dissipate heat well. This can also result in burning of the wood workpiece. Another deleterious effect resulting from the friction created by metal guide blocks is that they cannot be set close to the blade to accurately hold the blade secure for very accurate work. Other problems arise from metal guide blocks as currently used on bandsaws. For example, metal guide blocks are very noisy during operation of the bandsaw. Further, metal guide blocks can accidentally touch the teeth of the blade, thereby destroying the set of the teeth and rendering the blade useless, if they are not set perfectly. Since metal guide blocks cannot adequately hold small or narrow blades in the bandsaw, they sometimes are replaced with roller bearings, which are very expensive. In view of these and other shortcomings of prior art guide blocks, we developed the present invention to provide new and improved guide blocks for bandsaw blades.

Our invention provides, in a bandsaw having a continuous blade trained about a pair of wheels, guide blocks for restricting sideways movement of the blade characterized in that the guide blocks are made from a fiber reinforced phenolic material impregnated with graphite. Our new guide blocks provide numerous advantages over the prior art metal guide blocks now used in bandsaws which will be fully discussed in the detailed description which follows.

As noted, one of the primary objectives of our invention was to provide improved guide blocks as replacements for metal guide blocks now currently used in bandsaws. Another principle objective was to provide new guide blocks for bandsaws which can dissipate heat more effectively than metal guide blocks and thereby eliminate the adverse effects of heat generated by friction as now experienced with prior art metal guide blocks. Yet another principle objective was to provide new guide blocks for bandsaw blades that will reduce friction between the guide blocks and the blade in comparison to prior art metal guide blocks and which also will not stain or discolor wood work pieces. Other more specific objectives will appear in the description which follows.

BRIEF DESCRIPTION OF THE DRAWINGS

The description of the invention is made with reference to the following drawings, in which:

FIG. 1 is a perspective view, with portions broken away, of a typical bandsaw;

FIG. 2 is a detailed side view of the worktable station of the bandsaw;

FIG. 3 is sectional view illustrating guide blocks supported in a guide holder;

FIG. 4 is a schematic view of the worktable station of the bandsaw;

FIG. 5 is a perspective view of one shape of guide blocks of the invention; and

FIG. 6 is a perspective view of a second shape of guide blocks of invention.

DESCRIPTION OF PRESENTLY-PRESENTLY PREFERRED EMBODIMENTS (a) General Description of Bandsaw, FIGS. 1 and 2

FIG. 1 illustrates a typical bandsaw 10 comprising a frame 11 from which the various functional mechanisms of the saw are supported and including a bottom compartment 12 enclosed on one side by a removable bottom cover 13 and an upper compartment 14 enclosed on one side by a removable top cover 15. A worktable 16 is supported on the frame at the cutting station of the tool which includes a table slot 17 leading to an aperture 18. The worktable on a bandsaw also typically includes a miter slot 19. The worktable is adjustable so that it can be positioned horizontally or at various angles, and is held in place by a trunnion lock not shown.

A rotatable bottom wheel 20, carried on a shaft 21 journaled in the frame 11, is located in bottom compartment 12 of the bandsaw. A rotatable upper wheel 22 carried on a shaft 23 also journaled in the frame 11, is located in top compartment 14. A blade 25 in the form of a continous metal band is trained about bottom wheel 20 and upper wheel 22 and extends through aperture 18 of the worktable. Wheels 20 and 22 generally are rubber covered wheels so that the blade 25 is supported on the rubber covering about their periphery. Bottom wheel 20 is driven by an electric motor 24, either with a belt drive or direct drive, so that the wheel rotates when the motor is operated to cause blade 25 to rotate and thereby provide the cutting action of a workpiece supported on table 16. The blade has teeth 26 (see especially FIG. 2) formed along its front longitudinal edge; and the side towards which the teeth face will be referred to herein as the front of the bandsaw The rear edge 27 of the blade does not have teeth.

A guide post bracket 30 is supported from the frame 11 behind the blade 25 and carries a guide post 31. The guide post 31 is adjustable, and is held at a selected position by means of locking screw 32. Upper guide assembly 33 is attached to the lower end of guide post 31.

Turning now to FIG. 2, which illustrates the worktable station of the bandsaw 10 in detail, an upper thrust bearing 34 is supported on upper guide assembly 33 and positioned with its front surface adjacent to and slightly spaced from the back edge 27 of blade 25. Lower guide assembly 35 is attached to the bottom of worktable 16, in a fixed position on most bandsaws, and lower thrust bearing 36 is supported on lower guide assembly 35 and positioned with its front surface adjacent to and slightly spaced from the back edge 27 of the blade. Thrust bearings 34 and 36 thus serve to restrict rearward movement of blade 25 when a wood workpiece 37 is being cut with the bandsaw. Thrust bearings 34 and 36 each are rotatably mounted on a shaft 38 that can be adjusted to various positions in the assemblies 33 and 35, respectively, and held in place by set screw 39.

(b) Guide Blocks, FIGS. 2-4

Referring briefly to FIG. 2, an upper guide holder 40 is carried by upper guide assembly 33 and a lower guide holder 41 is carried by lower guide assembly 35. Guide holders 40 and 41 have the same structure, and the following description of holder 40 is also applicable to guide holder 41.

As shown in FIG. 3, guide holder 40 is a yoke-shaped element including a central shaft 42 and spaced arms 43 and 44. The arms 43 and 44 each include a longitudinal bore 45 near their outboard ends. Guide block 46 is carried in bore 45 of arm 43 and guide block 47 is carried in bore 45 of arm 44.

Blade 25 of the bandsaw extends between arms 43 and 44 of guide holder 40. Guide block 46 is positioned along one side of the blade and guide block 47 is positioned along the opposite side of the blade. Each guide block can be adjusted to various positions relative to the blade and is retained in a selected position in its respective arm by means of a set screw 48. The schematic view of the worktable station of the bandsaw of FIG. 4 illustrates the manner in which guide blocks 46 and 47 carried by upper guide holder 40 are positioned relative to the blade, one on each side of the blade above the worktable, and guide blocks 46' and 47' carried by lower guide holder 41 are positioned relative to blade 25 with one block on each side of the blade below the worktable. The guide blocks 46, 47 and 46', 47' thus serve to restrict or limit sideways movement of blade 25 while a workpiece is being cut. The side-to-side position of the guide blocks and their spacing from the blade is controlled by adjusting the position of the guide blocks in a respective arm of a holder 40,41 and then locking the guide blocks into a selected position by means of the set screws 48. The front-to-rear position of the guide blocks relative to the blade is controlled by adjusting the position of central shaft 42 of the guide holders 40 and 41 in a bore 50 defined in guide assemblies 33 and 35 and locking the holders in a selected position by means of a set screw 51 as shown in FIGS. 2 and 3. FIG. 4 also illustrates the manner in which thrust bearings 34 and 36 are located behind the blade 25 so as to restrict rearward movement of the blade while a workpiece is being cut with one thrust bearing located above the worktable 16 and the other located below the worktable.

In accordance with our invention, guide blocks 46, 47 and 46', 47' are made of fiber reinforced phenolic resin material that is impregnated with graphite. A preferred material is graphite impregnated fabric reinforced phenolic resin. Moreover, an especially useful and presently most preferred material for the guide blocks is a graphite impregnated phenolic resin laminate that includes multiple plies of a fabric reinforcement such as canvas or other suitable fabric. This construction is illustrated with guide block 46 shown in perspective in FIG. 5 wherein the guide block includes a graphite impregnated phenolic matrix 55 and numerous or multiple plies of reinforcement fabric 56. The foregoing types of phenolic materials are available commercially from a number of sources. A useful characteristic of this type of material is that it can be readily fabricated into guide blocks of suitable size and shape, such as by sawing and/or grinding, to provide replacement guide blocks that can be substituted for metal guide blocks of any bandsaw. Guide block 46 is rectangular in form as illustrated in FIG. 5. Guide block 60 illustrated in Fig. 6 has a round cross-sectional shape and is in the form of a rod. The end faces of a guide block that is positioned adjacent a bandsaw blade can be at right angles to the axis of the block, as shown by guide blocks 46 and 60, or the face can be inclined to the axis of the block. Thus no alteration or other modification of the bandsaw or its guide holders is necessary. This is an important feature inasmuch as the different models of bandsaws made by the various manufacturers utilize guide blocks of specific shapes, and replacement guide blocks should match the shape of the original metal guide blocks in order to be easily substituted for the metal blocks. The guide blocks are installed in the guide holders so as to have their front edge about 0.015" behind the gullet of blade 25 and their end faces about 0.003" to 0.005" from the sides of the blade, although the blocks also can be positioned such that their end faces in contact the blade.

We have found that our improved guide blocks made of the material as described above exhibit numerous important advantages over the prior art metal guide blocks now utilized in bandsaws. There is no heat build-up between the blade 25 of a bandsaw and our improved guide blocks because metal-to-metal contact between the blade and guide blocks has been eliminated. We have thereby eliminated the heat generated by friction;

this results in increased blade life because blades stay cooler than when metal guide blocks are used. Our improved guide blocks have another important advantage in that they can be utilized with a much wider range of saw blade sizes than the present metal guide blocks. For example, 99% of bandsaws utilizing metal guide blocks cannot control blades that are ⅛ inch or 1/16 inch wide; however, our improved guide blocks can handle these narrow blades, which often are needed for intricate saw work. Thirdly, our improved guide blocks cannot damage the blade teeth if the saw operator inadvertently allows them to strike the guide blocks while the saw is running; this nearly always results in a ruined blade when metal guide blocks are used. The cost of a bandsaw blade is substantially more than the cost of our improved guide blocks so that the cost of saving even one blade repays the cost of utilizing our new guide blocks. We have also found that our new guide blocks can be run in direct contact with the bandsaw blade, exclusive of the teeth, so that the tension applied to the blade by the tensioning mechanism of the bandsaw can be decreased slightly. The resistance of the guide blocks against the opposite sides of the blade provides the extra tension precisely where it is needed, i.e. right over the workpiece instead of where the blade is flexed over the wheels 20 and 22 of the bandsaw. Moreover, our new guide blocks maintain the beam strength of the bandsaw blade around the cutting station at the worktable because the blade cannot deflect or twist between the guide blocks; in many instances, this enables a smaller blade than usual to be employed to do the same cutting job. Furthermore, there is no metal-to-metal contact between our guide blocks and the bandsaw blade, so that the bandsaw runs quieter than a bandsaw employing metal guide blocks which results in less operator fatigue from excessive noise and makes it more pleasant to operate the bandsaw for long periods of time. Tests made with a sound meter have demonstrated that the decibel level of a bandsaw equipped with our new guide blocks is lower than that of a bandsaw having metal guide blocks, and that the sound level decreases when the bandsaw runs for an extended period of time such as one hour with our new guide blocks but increases when the saw is run with metal guide blocks.

Also, our new guide blocks lubricate and polish a bandsaw blade when in use, such as by constantly applying a light coating of graphite to the sides of the blade; this action is not obtained with metal guide blocks. Lastly, and of primary importance to the woodworker, our improved guide blocks result in exceptionally smooth cutting of a workpiece. Our guide blocks act as a blade stabilizer and serve to damp out vibration and lateral blade movement. The result is that the blade passes smoothly through the workpiece and leaves a smooth side wall on the cut. The practical benefits of a cleaner cut means the work can be rough sawn to a closer finish size and subsequent dimensioning is easier and faster because less material needs to be removed. In all respects, based upon our experience with prior art metal guide blocks and testing of the new guide blocks described above in comparison therewith, we have concluded that guide blocks according to the present invention provide the best available control of side-to-side movement of a bandsaw blade.

We claim:

1. In a bandsaw including a saw blade in the form of a continuous metal band that is trained about a pair of spaced wheels and rotatably driven past a worktable, and further including guide blocks for restricting side-to-side movement of the saw blade during cutting of a workpiece supported on the worktable, the improvement wherein:

the guide blocks are made of a fiber reinforced phenolic resin material impregnated with graphite, and the bandsaw includes at least one pair of guide blocks arranged with one guide block positioned along one side of the blade and the other positioned along the opposite side of the blade.

2. The combination of claim 1, wherein:

the guide blocks are made of a graphite impregnated phenolic resin laminate including multiple plies of reinforcement fabric.

3. The combination of claim 1 or 2, wherein:

the bandsaw includes a first pair of the guide blocks arranged above and near the worktable and a second pair of the guide blocks arranged below and near the worktable.

* * * * *